(No Model.) 6 Sheets—Sheet 1.
E. HORTON.
MACHINE FOR FINISHING CLOCK PALLETS.
No. 312,203. Patented Feb. 10, 1885.

Witnesses
Lillian D. Kelsey
E. S. Tooker

Everett Horton
Inventor.
By Atty (No Model.) 6 Sheets—Sheet 2.
E. HORTON.
MACHINE FOR FINISHING CLOCK PALLETS.
No. 312,203. Patented Feb. 10, 1885.

Witnesses.
Lillian D. Kelsey.
L. C. Tooker.

Everett Horton,
Inventor.
By Atty.

(No Model.) 6 Sheets—Sheet 3.
E. HORTON.
MACHINE FOR FINISHING CLOCK PALLETS.
No. 312,203. Patented Feb. 10, 1885.
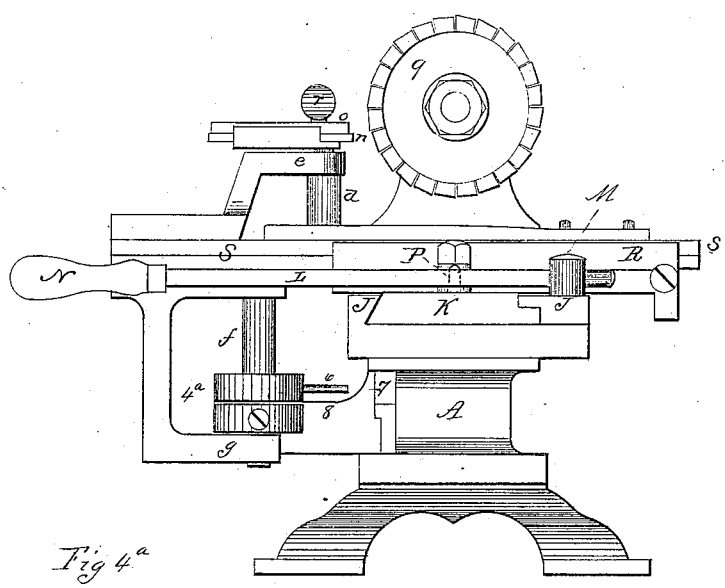
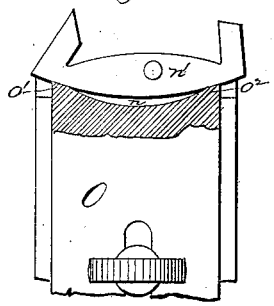
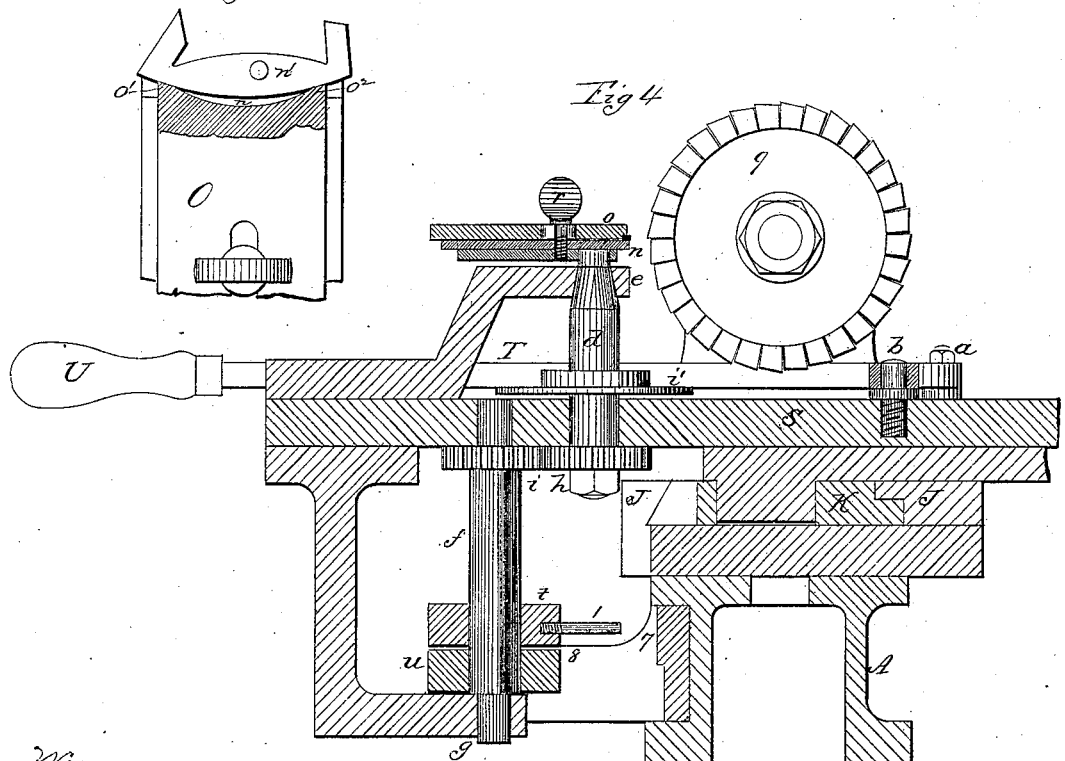

(No Model.) 6 Sheets—Sheet 4.
E. HORTON.
MACHINE FOR FINISHING CLOCK PALLETS.
No. 312,203. Patented Feb. 10, 1885.
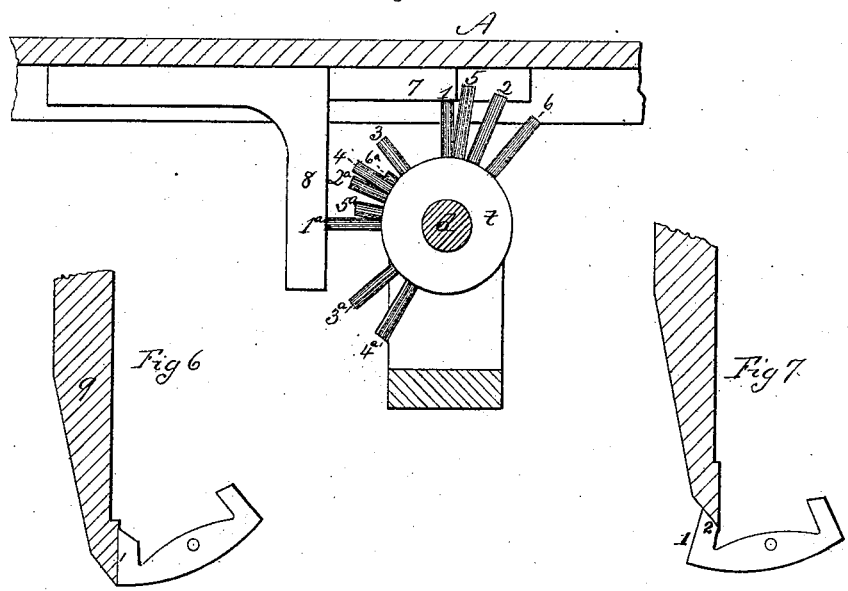
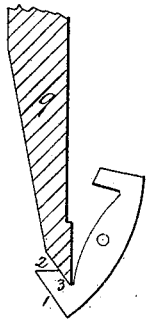
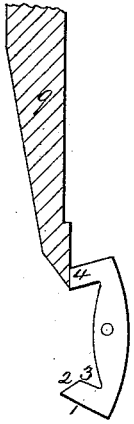
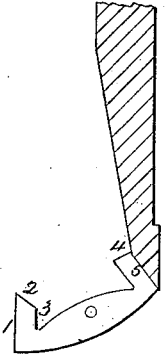
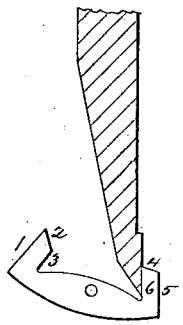

(No Model.)  6 Sheets—Sheet 5.

E. HORTON.
MACHINE FOR FINISHING CLOCK PALLETS.

No. 312,203.  Patented Feb. 10, 1885.

Witnesses  Everett Horton, Inventor (No Model.) 6 Sheets—Sheet 6.
E. HORTON.
MACHINE FOR FINISHING CLOCK PALLETS.
No. 312,203. Patented Feb. 10, 1885.
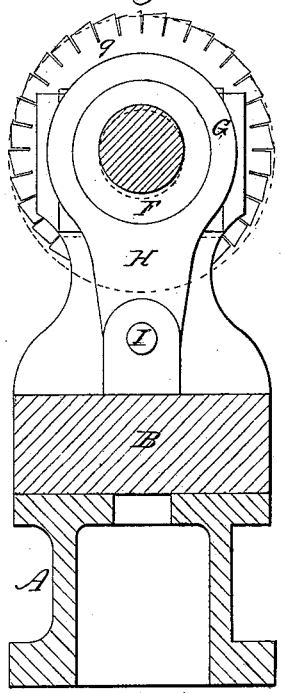
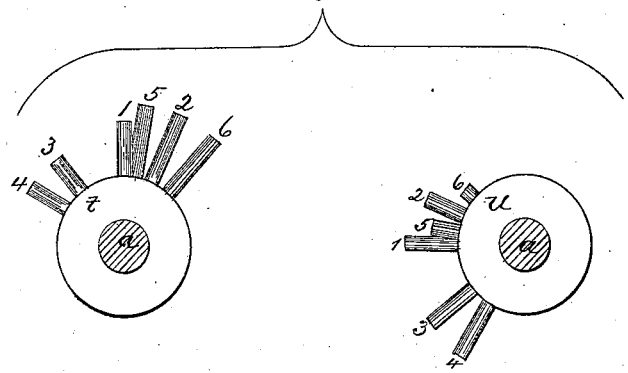

UNITED STATES PATENT OFFICE.

EVERETT HORTON, OF NEW HAVEN, CONNECTICUT.

MACHINE FOR FINISHING CLOCK-PALLETS.

SPECIFICATION forming part of Letters Patent No. 312,203, dated February 10, 1885.

Application filed August 9, 1884. (No model.)

*To all whom it may concern:*

Be it known that I, EVERETT HORTON, of New Haven, in the county of New Haven and State of Connecticut, have invented new Improvements in Machines for Making Clock-Pallets; and I do hereby declare the following, when taken in connection with accompanying six sheets of drawings, and the letters of reference marked thereon, to be a full, clear, and exact description of the same, and which said drawings constitute part of this specification, and represent, in—

Figure 1:
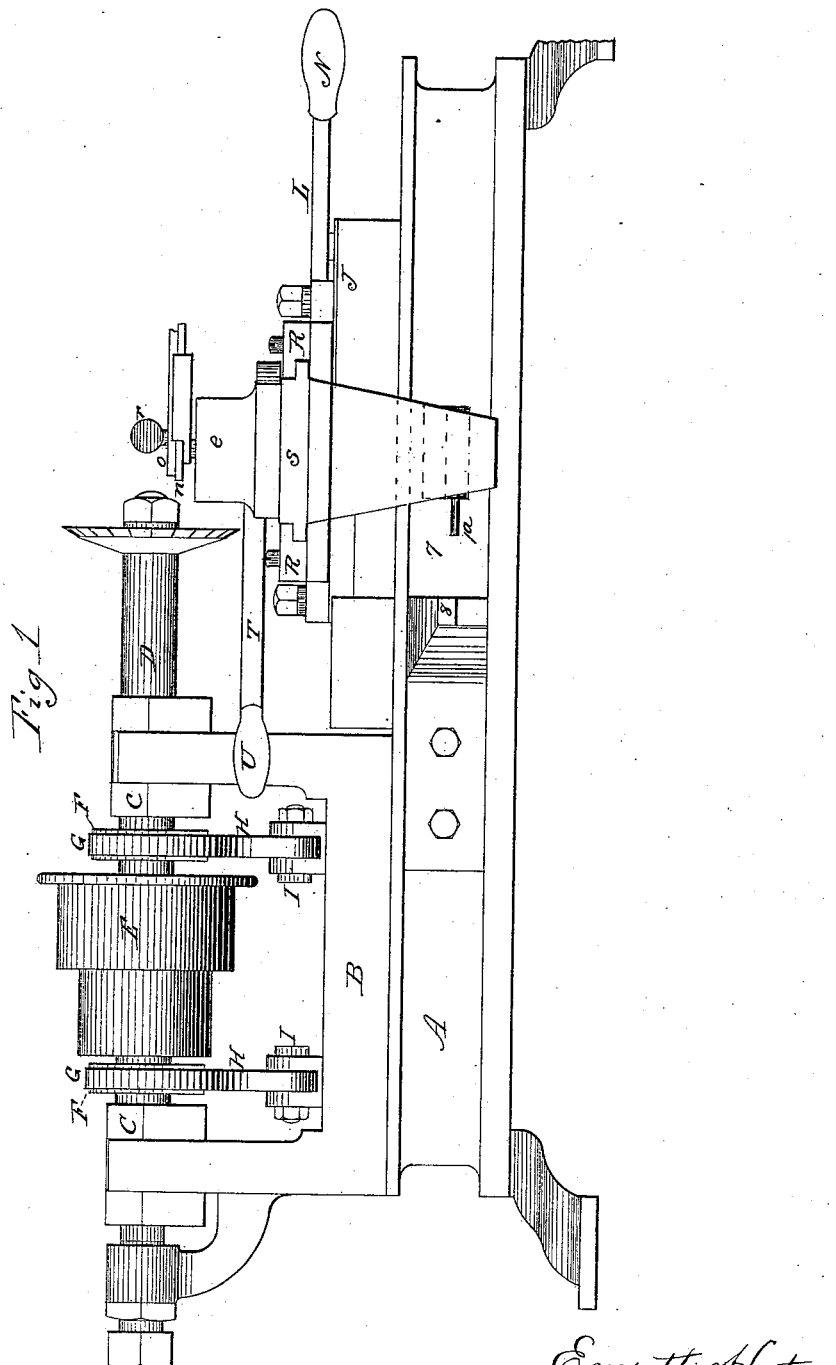
Figure 2:
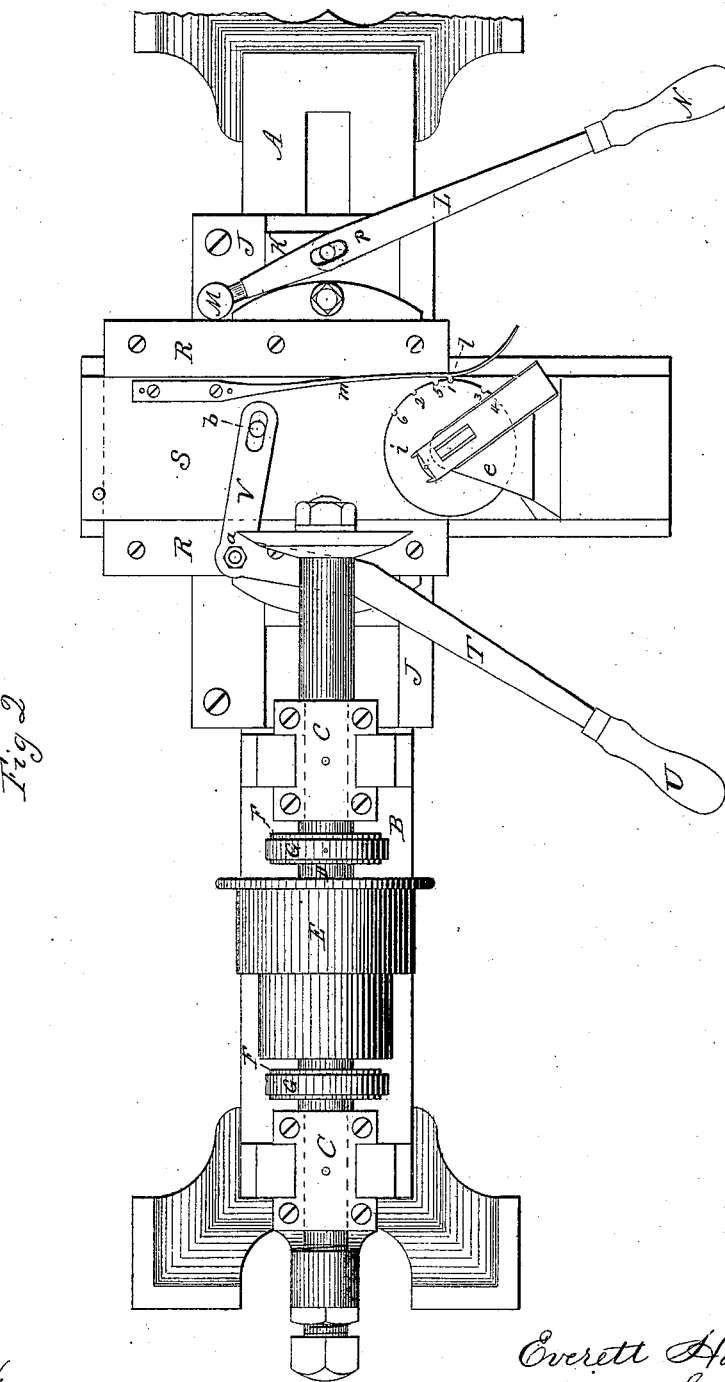
Figure 13:
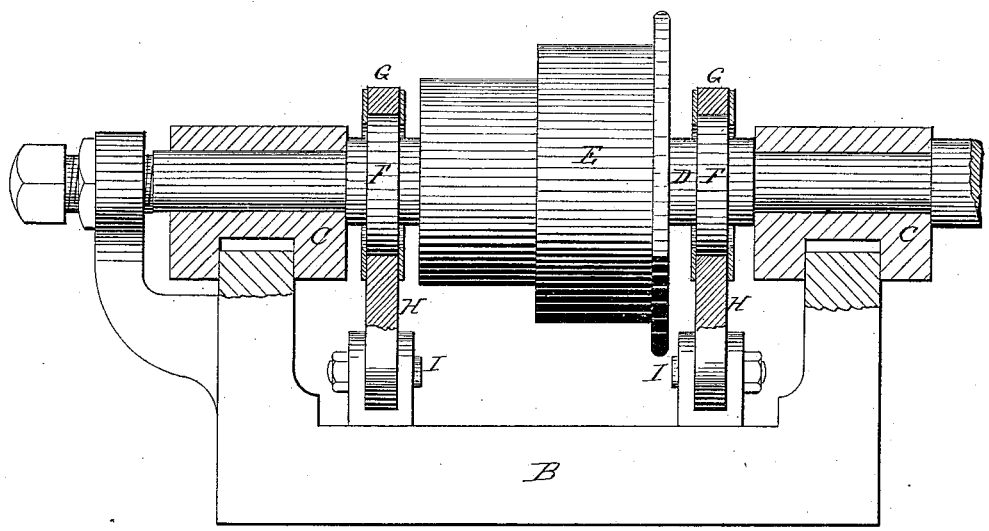
Figure 14:
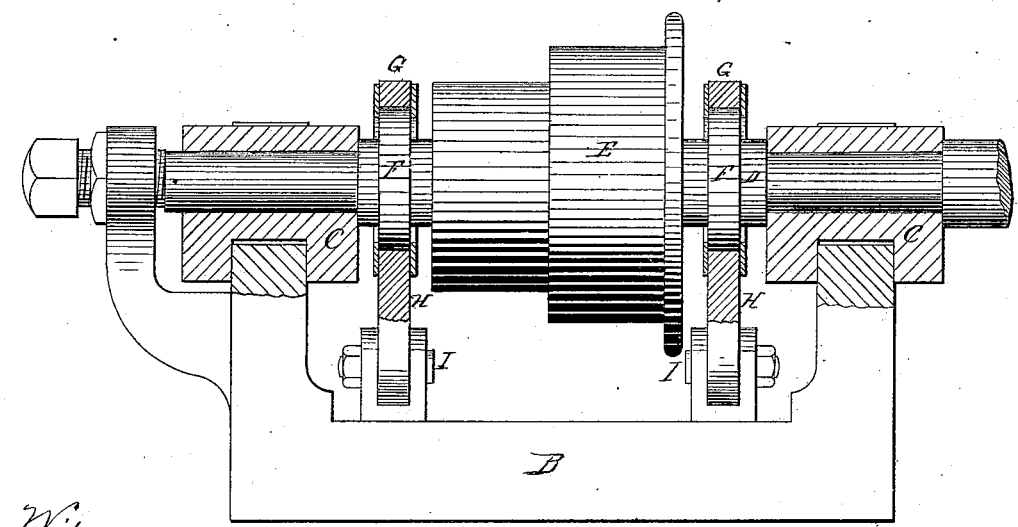

Figure 1, a front view; Fig. 2, a top view; Fig. 3, an end view from the right; Fig. 4, a vertical central section through the slide S; Fig. 4$^a$, a horizontal section through the clamping plate o, looking down upon the holder, and showing the method of locating the pallet on the holder, enlarged; Fig. 5, a horizontal section above the disk t, showing the two series of studs and their respective stops, enlarged; Figs. 6, 7, 8, 9, 10, and 11, diagrams illustrating the operation of the cut, enlarged; Fig. 12, a diagram showing the finished pallet, enlarged to four times its usual size; Figs. 13 and 14, sectional side views, and Fig. 15 a transverse section illustrating the method of imparting vertical reciprocating movement to the bearings of the cutter-arbor; Fig. 16, a modification.

This invention relates to an improvement in machines for making clock-pallets, and particularly to that class which are cut from sheet metal and of a shape as seen in Fig. 12. These pallets are stamped with a punch and die from sheet metal, which leaves the edges so rough that a finishing of those edges is necessary before they can be applied to the clock. This work has hitherto been done by placing the pallets in a templet of the exact shape of the finished pallet, and then with a file working down the surface of the pallet to the standard shape of the templet. In thus finishing the pallets by hand there is unavoidably a greater or less variation in the working surfaces, causing more or less difficulty in assembling and adjusting the parts.

The object of my invention is the construction of a machine whereby the edges of the pallet may be finished and all the pallets brought to precisely the same shape and size; and the invention consists, essentially, in a revolving cutter combined with a support for the pallet, and mechanism for turning the pallet to properly present the respective edges to the cutter, so that the edges will be dressed to a standard size, and as more fully hereinafter described.

A represents the bed of the machine, not unlike a small lathe-bed. At one end is a head-stock, B, in which two journal-boxes, C C, are arranged. These boxes are set in vertical slots in the head-stock, and so as to be moved downward and upward, as from the position in Fig. 13 to that in Fig. 14, and return. In these journal-boxes C the arbor D is arranged so as to revolve freely therein, power being communicated to the arbor through a pulley, E, or otherwise.

On the arbor D, near each of the boxes C C, an eccentric, F, is fixed. Around each eccentric is a strap, G, from which an arm, H, extends downward beneath the arbor, the lower end of each arm supported on a pivot, I, on the base of the head-stock. The eccentrics revolve with the arbor. The result of such revolution is to impart to the two boxes and the arbor an up-and-down reciprocating movement to the extent of the throw of the eccentric F, as from the position in Fig. 13 to that in Fig. 14, and return, and as indicated in broken lines, Fig. 15. The purpose of this up-and-down reciprocating movement will be explained hereinafter.

On the bed longitudinal guides J J are fixed, between which is a longitudinal slide, K. To the rear guide a hand-lever, L, is hung, as at M, provided at its forward end with a handle, N, and is also attached by a pivot, P, to the slide K, and so that the operator by means of the lever L may impart to the slide K a longitudinal back-and-forth movement.

On the slide K guides R R are arranged at right angles thereto, and in the said guides R R a slide, S, is arranged to be moved back and forth at right angles to the slide K.

To one of the guides R, as at a, a lever is hung, one arm, T, extending forward, terminating in a handle, U. The other arm, V, extends over the slide S, and is hung thereto by a pivot, b, and so that the operator holding the handle U in one hand may impart a backand-forth movement to the slide S at right angles to the slide K, while with the other hand upon the lever L he may at the same time impart a longitudinal movement to the slide K, which last movement will be communicated to the transverse slide S, thus enabling the operator to communicate a movement to the slide S either in a longitudinal or transverse direction.

$d$ is a vertical shaft arranged on the slide S, taking its bearing at the lower end in the slide, and its upper end supported in a bearing, $e$.

$f$ is a shaft arranged below the slide, but parallel with the shaft $d$, its upper end taking a bearing in the slide, and its lower end supported in a bearing, $g$, extending downward from the slide S.

On the shaft $d$ is a toothed pinion, $h$, which works into a corresponding pinion, $i$, on the shaft $f$, so that a rotation imparted to one shaft will be communicated to the other, and to the same extent.

On the shaft $d$, above the slide S, is a disk or dial-plate, $i'$, having a series of notches in its edge, into which the nose $l$ of a spring-dog, $m$, may set, so as to hold the disk and the shaft with which it is connected at any point to which it may be set.

Upon the upper end of the shaft $d$ a holder, $n$, for the pallet-blank is fixed in a plane parallel with the slide S, but so as to partake of whatever rotation may be given to the shaft $d$. The inner end of the holder $n$ is fitted to receive the pallet and leave its working surfaces exposed. The pallet is secured thereon by a clamp, $o$, upon which a clamping-screw, $r$, is brought to bear, as seen in Fig. 4, and so that by turning the shaft $d$ the pallet will be turned to present its respective edges to the cutter.

On the shaft $f$ a collar, $t$, is fixed, from which project radially a series of studs, 1, 2, 3, 4, 5, and 6. Below the collar $t$ is a like collar, $u$, carrying a second like series of studs, $1^a, 2^a, 3^a, 4^a, 5^a$, and $6^a$, one of each series corresponding to one of the second series, and the corresponding studs of one series being at right angles to the studs of the other series, as seen in Fig. 5.

On the front of the bed A is a stop, 7, which stands in line with one series of studs, and from the bed an arm projects, forming a stop, 8, for the other series at right angles to the stop 7. When the shaft $d$ stands in the position seen in Fig. 5, the stud 1 of one series strikes the stop 7, and the other or corresponding stud, $1^a$, strikes the stop 8.

In operation the slide S is moved, say, to the right and forward, so as to take the several studs out of reach of their respective stops. The pallet is secured in the holder. Then the operator turns the disk $i$ until the notch 1 comes into engagement with the nose $l$ of the dog $m$. The several notches 1, 2, 3, 4, 5, and 6 on the dial correspond, respectively, to the studs on the shaft $d$ below; hence when the disk $i'$ stands, as shown in Fig. 2, with the notch 1 engaged with the dog $l$, then the stud 1 projects directly forward toward the bed, and its companion stud $1^a$ projects to the left at right angles thereto. The operator then moving the lever L to the left, will take the slides K and S in that direction until the stud $1^a$ comes against the stop 8. Then he moves the lever T until the slide S advances to bring the stud 1 against the stop 7, and as seen in Fig. 5.

On the arbor D the cutter 9 is fixed. The edge of this cutter upon its right-hand side is in a plane at right angles to its axis. On the reverse side it is inclined, as seen in Figs. 6, 7, &c.

The pallet as seen in Fig. 12 presents six surfaces to be dressed. These are numbered 1, 2, 3, 4, 5, and 6, corresponding, respectively, to the notches in the disk $i$ and to the studs below.

The pallet, held as before described, and under the movement of the slides K and S, is presented first to the cutter 9, as seen in Fig. 6, and the toe or surface 1 is dressed, the cutter operating upon that surface until the studs below come to a bearing against their respective stops. This done, the slides are withdrawn to take the pallet out of reach of the cutter. Then the holder is turned to bring the notch 2 into engagement with the dog $m$, and there held will be moved to the left by the lever L until the stop $2^a$ comes against the stop 8. Then under the action of the lever T the pallet will be advanced toward the back of the cutter, and the surface 2 or impulse will be dressed by the back of the cutter, as seen in Fig. 7. This done, the pallet is again withdrawn from the cutter and turned until the notch 3 of the disk engages with the dog $m$. Then by the action of the lever L, as before, the slides will be moved to the left until the stud $3^a$ comes against the stop 8. Then under the action of the lever T the slide S will be moved forward, taking the pallet to the edge of the cutter, and the side 3 or repose will be dressed by the back of the cutter, as seen in Fig. 8. This done, the slides are again withdrawn from the cutter and the disk $i$ turned until the notch 4 engages the dog $m$, and which brings the corresponding studs 4 and $4^a$ into action, the slide S is moved forward under the action of the lever T until the stud 4 comes in contact with its stop 7. Then under the action of the lever L the slide S, with the pallet, is moved toward the cutter and until the stud $4^a$ comes to a bearing against the stop 8, and by which operation the edge 4 or impulse will be dressed by the flat edge of the cutter, as seen in Fig. 9. This done, the slides are again withdrawn to take the pallet from the cutter. Then the disk $i$ is turned to bring notch 5 into engagement with the dog $m$. Then under the action of the lever L the slide K is moved to the left until the stud $5^a$ comes to a bearing against its stop 8, and then under the action of the lever T the slide S is advanced to present the side 5 or repose to the back of the cutter, as seen in Fig. 10. This edge finished, the slides are again withdrawn as before, the disk $i$ turned to bring the notch 6 into engagement with the dog $m$. Then under the action of the lever T the slide S is advanced until the stud 6 comes to a bearing upon the stop 7, and then under the action of the lever L the slides are moved to the left, bringing the inner side, 6, of the heel of the pallet against the flat face of the cutter and until the corresponding stud $6^a$ comes to a bearing against the stop 8, which finishes the pallet. The slides are again withdrawn, the finished pallet removed, and a new blank introduced and dressed as before. By this operation all the pallets dressed must be of precisely the same size and shape, and present precisely the same angles, and thereby avoid the variation which must occur in hand-shaped pallets, and the difficulties attending hand-finishing.

To perfectly insure the proper position of the pallet in the holder preparatory to dressing the surfaces, I set a stud, $n'$, on the upper surface of the holder $n$ corresponding to the hole made through it for its attachment to the rod. The clamp $o$ upon its under face is recessed so as to form two bearing-points, $o'$ $o^2$, at two opposite extremes on the back of the pallet.

To apply the pallet on the holder, the clamp $o$ is moved backward, which movement is permitted by the slot through which the clamping-screw $r$ extends, then the pallet is set upon the stud $n'$, the clamp $o$ moved forward, bringing the two points $o'$ $o^2$ hard against the back of the pallet at opposite ends, and the clamping-screw applied. The hole $n$ in the pallet is necessarily positive and fixed, and the bringing of the two extremes of the back of the pallet to two fixed points insures the same relative position of all pallets. If, perchance, the dressing of one or more faces of a pallet should be omitted in the operation the pallet may be subsequently replaced upon the holder, and these unwrought faces be finished with the same accuracy as if they had been finished in the first operation. As the surfaces are presented to the back of the cutter, or any part of it which is in a plane other than at a right angle to its axis, the surface dressed will be curved according to the circumference of the cutter.

It is necessary that the impulse and repose surface on the pallet shall be flat, to be properly acted upon by the teeth of the crown-wheel. The up-and-down movement imparted to the arbor which carries the cutter, and hereinbefore described, accomplishes this result, the up-and-down movement being at least to the extent of the thickness of the pallet. Because the cutter thus moves up and down in operating upon the surface, it follows that the surface will be flat, and the concave shape which would result from the axis of the cutter remaining stationary is avoided.

I have represented the shaft $f$ as separate from but parallel with the shaft $d$. This shaft $f$ is, however, to be considered as a continuation of the shaft $d$, as it will be evident they may be but a single shaft.

The studs of the two series are made adjustable by screwing them into their collar $t$, as seen in Fig. 4, so that they may be lengthened by withdrawing them, or shortened by turning them inward.

Instead of stopping the movement of the slides by the two series of studs, as described, the collar may be constructed with corresponding projections, made as an integral part of the collar or shaft, as seen in Fig. 16. Therefore, by the term "studs" I wish to be understood as including any projections from the holder, directly or indirectly, by which the two slides may be stopped at the proper position.

Instead of constructing the disk $i$ with notches into which the dog will engage, any of the known equivalents may be employed. I therefore do not wish to be understood as limiting the invention to the notches described and shown.

I claim—

1. The combination of a revolving cutter, a slide movable parallel with the axis of the cutter, and a second slide arranged upon the first, movable at right angles thereto, a rotating shaft arranged upon said second slide, and carrying a holder to support the pallet, also provided with a disk constructed with notches corresponding to the respective edges of the pallet, and a dog arranged to engage said disk at its several positions and thereby locate the pallet with relation to the cutter, substantially as described.

2. The combination of a revolving cutter, longitudinal slide K, transverse slide S, vertical shaft $d$ on said slide S, carrying the pallet-holder, and also carrying a disk, $i'$, constructed with a series of notches corresponding to the respective edges of the pallet to be dressed, a dog to engage said disk, two series of radially-projecting studs, the studs of one series at substantially right angles to the corresponding studs of the other series, and stops 7 and 8 corresponding, respectively, to said two series of studs, substantially as described.

3. The combination of the revolving cutter, the slide K, movable in a plane parallel with the axis of said cutter, the slide S, arranged upon said slide K, and movable at right angles thereto, a holder to receive the pallet to be dressed, and arranged to rotate in a plane parallel with the axis of the cutter, said holder provided with a series of notches corresponding to the respective edges of the pallet to be dressed, a dog to engage either of said notches, the arbor of said cutter arranged in bearings movable in guides parallel with the axis of rotation of said holder, and the mechanism, substantially such as described, to impart an up-and-down reciprocating movement to said arbor and cutter, substantially as described.

4. The combination of the revolving cutter, the slide K, movable in a plane parallel with the axis of the cutter, a slide, S, arranged on said slide K, and movable at right angles thereto, the pallet-holder arranged on said slide S, and so as to rotate upon an axis at right angles to the path of movement of said slide, said holder provided with a series of notches corresponding to the respective edges of the pallet to be dressed, a dog to engage either of said notches, said holder provided with two series of projections at right angles to the axis of rotation, and each projection of each series corresponding to the respective notches on the holder, corresponding projections in the two series at right angles to each other, and a stop against which the correresponding projections of each series will strike to arrest the movement of the two slides with relation to each other and to the cutter, the said cutter arranged in bearings movable in a plane parallel with the axis of rotation of said holder, and the mechanism, substantially such as described, to impart reciprocating movement to said bearings, substantially as described.

5. The combination of the cutting devices to dress the respective edges of the pallet, the holder $n$, provided with the stud $n'$, corresponding to the hole through the pallet, and the clamping-plate $o$, constructed with bearings $o'$ $o^2$ for the back of the pallet at opposite ends, substantially as described.

EVERETT HORTON.

Witnesses:
JOS. C. EARLE,
L. E. TORCKER.